United States Patent [19]

McCullough, Jr. et al.

[11] Patent Number: 5,223,324

[45] Date of Patent: * Jun. 29, 1993

[54] FLAME RETARDANT FOAMS

[75] Inventors: Francis P. McCullough, Jr., Lake Jackson, Tex.; Bhuvenesh C. Goswami, Clemson, S.C.; R. Vernon Snelgrove, Damon, Tex.

[73] Assignee: The Dow Chemical Company, Midland, Mich.

[*] Notice: The portion of the term of this patent subsequent to Sep. 29, 2009 has been disclaimed.

[21] Appl. No.: 383,839

[22] Filed: Jul. 21, 1989

Related U.S. Application Data

[63] Continuation-in-part of Ser. No. 149,748, Jan. 29, 1988, Pat. No. 4,857,394.

[51] Int. Cl.$^5$ ............................................. D06N 7/04
[52] U.S. Cl. ......................................... 428/143; 5/459; 5/481; 428/283; 428/317.9; 428/408; 521/54
[58] Field of Search .................... 428/317.9, 283, 284, 428/297, 408, 143; 5/459, 481; 521/54

[56] References Cited

U.S. PATENT DOCUMENTS

| | | | |
|---|---|---|---|
| 3,770,668 | 11/1973 | Corbett et al. | 260/2.5 E |
| 3,960,792 | 6/1976 | Nakamura | 260/2.5 E |
| 4,412,675 | 11/1982 | Kawakubo | 521/99 |
| 4,489,913 | 12/1984 | Gurgiolo et al. | 521/53 |
| 4,552,903 | 11/1985 | Nyziger et al. | 521/137 |
| 4,574,137 | 3/1986 | Serratelli et al. | 524/724 |
| 4,581,418 | 4/1986 | Serratelli et al. | 525/404 |
| 4,596,665 | 6/1986 | Gonzalez et al. | 252/182 |
| 4,698,369 | 10/1987 | Bell | 521/99 |

*Primary Examiner*—James J. Bell

[57] ABSTRACT

A flame retardant polymeric foam having a flame retarding amount of non-graphitic carbonaceous materials having an LOI value greater than 40.

21 Claims, No Drawings

FLAME RETARDANT FOAMS

RELATED APPLICATIONS

This application is a continuation-in-part of application Ser. No. 149,748, filed Jan. 29, 1988 of Mc Cullough et. al., now U.S. Pat. No. 4,857,394.

FIELD OF THE INVENTION

This invention relates to a method for the production of flame-retardant polymeric foams and to novel foam structures obtained thereby. More particularly, the invention provides a means for preparing polyolefin resin, polystyrene, latex, urea, isocyanurate and polyurethane foam structures or the like so as to be flame-retardant along its exterior surface or its entire structure through the use of non-graphitic carbonaceous materials.

BACKGROUND OF THE INVENTION

The physical and mechanical properties of foams make them useful for a wide variety of applications, including upholstery and bedding. However, many foams, for example polyurethane, are inherently flammable and lead to melting and spread of burning debris. In the case of many "conventional" foams such characteristics lead to the sustaining of combustion by progressive smoldering even after the actual flames have extinguished.

It is considered that cellular materials manufactured from flammable polymers are more flammable than the solid materials because the insulating effect of their cellular nature allows a rapid build-up of heat at the heating surface with a consequence high rate of pyrolysis. In solid materials this heat build-up is at a lower rate because of the higher conductivity of the solid material. Although rigid foams have similar thermal conductivity behavior to flexible foams, the high cross-linked nature of their chemical structure makes them less flammable as polymers and also inherently more inclined to form a protective char rather than to form the flaming molten polymer droplets which occur with flexible foams. While both solid and rigid cellular materials burn less easily than flexible foams and are easier to extinguish, they tend to smolder and emit toxic fumes.

The use of polyurethane foams in airplanes in a particular concern. Fires in airplanes are difficult to extinguish when they start since adequate firefighting equipment is not readily available because of weight and size limitations in storage on the aircraft and the inability to maneuver around the passengers. It is therefore desirable to provide a polyurethane foam for use as seat cushions which is fire retardant, does not smolder and is self-extinguishing.

Various methods are known to reduce the flammability of polymer foams. Commonly, additives such as aluminum trihydride or phosphous-containing compounds are incorporated into the foam for this purpose. Alternatively, halogenated polyols, especially brominated polyols such as dibromoneopentyl glycol, are used to increase the flame resistance in the foam. None of these additives have proved entirely satisfactory.

. It is known that the incorporation of trimerized polyisocyanates (i.e. isocyanurates) into a foam improves its burn characteristics. For example, trimerized toluenediisocyanate has been used to prepare flexible foams. Although these foams do exhibit good foam characteristics, they also have poor physical properties, particularly poor compression sets and partial cell collapse. In addition, trimerized toluene diisocyanate tends to precipitate from the isocyanate solution in which it is dissolved, causing storage problems and a lack of uniformity in foams prepared therewith.

Each of U.S. Pat. Nos. 4,554,293; 4,528,300 and 4,640,933 to Park, which are herein incorporated by reference disclose polyolefin resin foams which can be used in the present invention.

U.S. Pat. No. 4,699,931 to Fuzesi et. al., which is herein incorporated by reference, discloses polyol-free isocyanurate foams which can be used in the present invention.

U.S. Pat. Nos. 4,489,913; 4,552,903; 4,574,137; 4,581,418 and 4,596,665, which are all herein incorporated by reference, disclose the different types of polyurethane foams which may be utilized in the invention and whose flame retarding characteristics can be improved by the method hereinafter described.

U.S. Pat. Nos. 3,770,668 and 3,960,792 which are herein incorporated by reference, disclose typical polystyrene foams which can be utilized in the present invention.

U.S. Pat. No. 4,699,943 to Bertrand, which is herein incorporated by reference, discloses self-extinguishing polystyrene compositions with improved thermal properties. The polystyrene foams are blended with a fire retarding agent consisting of tribromopentaerythritol. There are also disclosed polystyrene compositions whose self-extinguishing characteristics can be further improved by the present invention.

European Patent Application 0199567 of Mc Cullough et. al., which corresponds to U.S. patent application Ser. No. 856,305, and is herein incorporated by reference, discloses non-linear carbonaceous fibers which are used to provide the improvements in accordance with the present invention.

The carbonaceous materials of the invention have a carbon content of at least 65% and according to the test method of ASTM D 2863-77 have an LOI value greater than 40. The test method is also known as "oxygen index" or "limited oxygen index" (LOI). With this procedure the concentration of oxygen in $O_2N_2$ mixtures is determined at which a vertically mounted specimen is ignited at its upper end just continues to burn. The size of the specimen is $0.65 \times 0.3$ cm with a length from 7 to 15 cm. The LOI value is calculated according to the equation:

$$LOI = \frac{[O_2]}{[O_2 + N_2]} \times 100$$

The term "stabilized" used herein applies to precursor fibers or tows which have been oxidized at a specific temperature, typically less than about 250 degrees Celsius for PAN fibers, provided it is understood that in some instances the filament and/or fibers are oxidized by chemical oxidants at lower temperatures.

The term "reversible deflection" as used herein applies to a helical or sinusoidal compression spring. Particular reference is made to the publication "Mechanical Design—Theory and Practice", MacMillan Publ. Co., 1975, pp 719 to 748; particularly Section 14-2, pages 721-24.

The term "non-graphitic" as used herein refers to the carbonaceous materials which are partially carbonized, that is, the elemental carbon content is less than 98 percent, preferably less than 92 percent and does not have the characteristics of carbon fiber or graphitic fibers as described in U.S. Pat. No. 4,005,183 to Singer, which is herein incorporated by reference.

SUMMARY OF THE INVENTION

In accordance with the present invention there is provided a flame retardant polymeric foam comprising at least about 0.5% of non-graphitic carbonaceous materials, for example, linear and/or non-linear carbonaceous fibers derived from stabilized polymeric fibers and includes carbonaceous particles, platelets and the like, with the proviso that when the carbonaceous fibers are non-linear there are present carbonaceous particles and/or platelets. Preferably, the foam is a polystyrene, polyolefin resin, urea, latex, polyurethane or isocyanurate foam. Also, epoxy foam can be used as a binder with the carbonaceous fibers.

The non-linear carbonaceous filaments having a reversible deflection ratio of greater than 1.2:1, preferably greater than 2.0:1, and an aspect ratio (1/d) greater than 10:1. The linear and non-linear carbonaceous fibers, particles and platelets essentially have an LOI value greater than 40 and in combination with the foam provide a synergistic effect with respect to the fire retarding and self-extinguishing characteristics of the foam.

It is understood that when the lower amounts of the non-graphitic carbonaceous materials are being utilized, that is 0.5%, the carbonaceous material is intended to be primarily on the surface of the foam structure. The carbonaceous materials and foam act in combination to retard flame propagation and to extinguish any smoldering on the surface. To provide the foam structure throughout with similar fire retarding and self-extinguishing characteristics, the amount of carbonaceous materials in the form of fibers, particles and/or platelets should be increased and the fibers distributed throughout the foam. When only linear carbonaceous fibers are utilized, it is preferably to utilize at least 10% of the fiber. However, the particles or platelets provide a suitable substitute for some of the fibers.

Amounts of up to about 10% by weight of carbonaceous have been found to be sufficient to obtain a dependable distribution of carbonaceous fibers forming an effective barrier portion along the foam's exterior surface.

The amount of Carbonaceous materials required will depend upon the degree of flame retardance desired for the foam but usually the amount of carbonaceous materials will not exceed about 30% by weight so as to maintain a substantial portion of the foam's original characteristics.

The carbonaceous materials may comprise the sole flame-retardant additive in the foam forming reaction. Alternatively, other flame-retardant additives, known per se, may be used in addition to the carbonaceous fibers, for example, halogen and/or phosphorous containing compounds, antimony oxides, boron-containing compounds, and the like.

The object of the invention is to provide a flame-retardant polymeric foam from a foam forming reaction mixture which also contains carbonaceous materials.

It is another object of the invention to provide a flexible flame-retardant polyurethane foam comprising the reaction product of a polymeric polyol and an organic polyisocyanate characterized in that the foam-forming reaction mixture contains carbonaceous materials.

It is yet still another object of the invention to provide a flame-retardant polystyrene foam containing carbonaceous materials.

It is still a further object of the invention to prepare a self-extinguishing fire retardant urethane-free isocyanurate foam.

It is yet another object of the invention to provide a method for preparing a flame-retarding self-extinguishing polymeric foam.

The carbonaceous material which may be utilized in the invention may be derived from stabilized acrylic fibers which are classified into three groups depending upon the particular use and the environment that the structures in which they are incorporated are placed.

In a first group, the non-flammable carbonaceous materials are non-electrically conductive.

The term non-electrically conductive as utilized in the present application relates to carbonaceous materials having a carbon content greater than 65% but less than 85%, and do not possess any electrostatic dissipating characteristics, i.e., they are not able to dissipate an electrostatic charge.

The term "electrically non-conductive" as utilized in the present invention relates to a resistance of greater than $4 \times 10^6$ ohms/cm when in fiber form and measured on a 6K tow of fibers having a diameter of 4 to 20 microns. The specific resistivity is greater than about $10^{-1}$ ohm/cm as calculated from measurements described in European Patent Application No. 0199567.

When the precursor fiber is a heat set stabilized acrylic fiber, it has been found that a nitrogen percentage of about 18% or more results in an electrically non-conductive fiber.

In a second group, the non-flammable carbonaceous materials are classified as being anti-static and having low electrically conductive. These materials have a carbon content of less than 85%. The percentage nitrogen content of such fibers is generally 16 to about 18%. In some materials derived from acrylic terpolymers the nitrogen content may be higher. Low conductivity means that a 6K tow of the material when in fiber form has a resistance of about from $4 \times 10^6$ to $4 \times 10^3$ ohms/cm. Such materials can be utilized to dissipate static build-up in the foams.

The third group contains the fibers having a carbon content of at least 85% and a nitrogen content of less than about 16%. These fibers as a result of their high carbon content have good electrical conductivity ( a resistance of less than $4 \times 10^3$ ohms/cm).

The precursor stabilized acrylic filaments which are advantageously utilized in preparing the fibers of the structures are selected from the group consisting of acrylonitrile homopolymers, acrylonitrile copolymers and acrylonitrile terpolymers.

The acrylic copolymers and terpolymers preferably contain at least about 85 mole percent of acrylic units, preferably acrylonitrile units, and up to 15 mole percent of one or more monovinyl units copolymerized with styrene, methylacrylate, methyl methacrylate, vinyl chloride, vinylidene chloride, vinyl pyridine, and the like.

The carbonaceous materials may be obtained from selected stabilized starting materials such as pitch (petroleum or coal tar), polyacetylene, polyaramides, polyvinyl chloride, acrylonitrile based materials, i.e., polyacrylonitrile (PANOX or GRAFIL-01), polyphenylene, and the like.

Preferred precursor materials are prepared by melt spinning or wet spinning the precursor materials in a known manner to yield a monofilament or multi-filament fiber tow and the fibers or filaments yarn, tow, woven cloth or fabric or knitted cloth by any of a number of commercially available techniques, heating the resulting material, preferably to above about 550 degrees Celsius and thereafter deknitting and opening to produce a fluff which may be laid up in batting-like form. The particle or platelets can be obtained by grinding the carbonaceous fibers in a known manner.

DESCRIPTION OF THE PREFERRED EMBODIMENTS

The invention comprises flame-retardant polymeric foams having at least about 0.5% by weight of non-flammable non-graphitic carbonaceous materials having an LOI value greater than 40. Advantageously, amounts up to about 10% of the carbonaceous materials utilized to produce a foam structure having the carbonaceous materials are utilized to produce a foam structure having the carbonaceous materials primarily on the surface so as to form a flame barrier.

Obviously, it is possible to produce a similar structure by reacting the foam forming ingredients in a mold with the carbonaceous materials being placed in the mold during foam formation. In such a case, linear or non-linear fibers can be utilized. However, according to this invention non-linear fibers are used in combination with carbonaceous particles and/or platelets.

In another embodiment of the invention, a foam structure is prepared having an effective amount of carbonaceous materials distributed through the structure to provide flame retarding and fire extinguishing properties throughout. In such a case, the foam is prepared by admixing the carbonaceous materials and the reaction mixture while initiating the foam forming reaction. The carbonaceous materials may be present in an amount up to about 30% by weight without affecting to any material extent the original foam characteristics.

PREPARATION OF FOAM

The foams which may be utilized in the invention may be formulated so as to be flexible, semi-rigid or rigid in nature. The foams of the invention can take the form of pellets, coatings, pads, seat pads, cases, structural material and the like.

The polyurethane foams employed in the present invention are preferably prepared from a polyol reactant, which is mixed with an aqueous polyisocyanurate reactant. The foams thus generated are characterized by a crosslinked molecular network.

The polyols used in the preparation of the polyurethane product to be foamed in accordance with the present invention preferably have an average molecular weight of from 200 to about 20,000 more preferably between about 600 and about 6,000 with a hydroxyl functionality of 2 or greater, preferably from about 2 to about 8.

The polyol is reacted with a polyisocyanate in a convention manner together with the carbonaceous fibers of the invention. The reaction can be carried out in an inert atmosphere, such as under a nitrogen blanket, at atmospheric pressure and at a temperature in the range of about 0 degrees Celsius to about 120 degrees Celsius for a period of time ranging up to about 20 hours, depending upon the temperature and the degree to which the reaction mixture is agitated. The reaction can also be carried out under ambient conditions.

The reaction is effected using stoichiometric amounts of reactants. It is desirable, however, in some cases to use an excess of polyisocyanate in order to insure complete reaction of the polyol. The ratio of isocyanate groups to hydroxyl groups is generally between about 1 to about 4 isocyanate groups per hydroxyl group.

The polyisocyanates employed in the reaction may include a polyaryl polymethylene polyisocyanate as defined in U.S. Pat. No. 2,683,730, for example, benzene 1,3,5-triisocyanate; chlorophenyl diisocyanate; 3,3'-dimethoxy-4,4'-biphenylene-diisocyanate, and the like.

Readily available aromatic diisocyanate, aliphatic and cycloaliphatic diisocyanates and polyisocyanates or mixtures thereof, having a high degree of activity, are suitable for use in the reaction.

Polystyrene foams used in the invention may be prepared by conventional methods.

Presently known techniques of preparing expanded polystyrene include the extrusion of a thermoplastic resinous gel in admixture with a volatile raising or blowing agent into a region of lower pressure where the volatile raising agent vaporizes and forms a plurality of gas cells within the extruded gel. The extruded foamed gel is subsequently cooled to form a self-supporting cellular foamed body. A wide variety of foaming or raising agents are known. These foaming or raising agents primarily fall into the class of aliphatic hydrocarbons such as butane, hexane, heptane, pentanes and the like, as well as gases which are soluble in a polymer under pressure such as carbon dioxide.

Beneficially, certain fluorinated hydrocarbons are used such as trichlorofluoromethane, trifluoromethane and the like, as well as such chlorohydrocarbons as methyl chloride. Many of these raising agents are found to be satisfactory with various polymeric materials.

The following examples are illustrative of the invention, but are not be construed as to limiting the scope thereof in any manner. The percentages disclosed relate to percentage by weight.

EXAMPLE 1

A flexible polyurethane foam was prepared by mixing in a quart (0.95 l) size paper cup 100 parts by weight (pbw) of a polyether triol having an average molecular weight of about 3000 commercially available from The Dow Chemical Company as Voranol 3137. 4.3 pbw Water, 1.2 parts of L-540 a silicone surfactant commercially available from Union Carbide Corp., and Dabco 33 LV a mixture of 33% by weight of triethylenediamine in dipropylene glycol commercially available from Air Products Co. Then a separate mixture of 1.715 parts of stannous octoate catalyst and 45.2 ml of an 80/20 mixture of 2,4-/2,6-toluenediisocyanate are stirred with the polyol-containing mixture in a one-half gallon (1.89 l) cardboard cup. Stirring was stopped when the reaction started. The resultant mixture foamed and filled a cup containing 1 part by weight of carbonaceous fibers to give a flexible foam with carbonaceous fibers covering the outside surface.

EXAMPLE 2

The procedure of Example 1 was followed except that 5 parts of linear carbonaceous fibers and 5 parts of carbonaceous particles were utilized. Also, the reaction mixture was continually mixed when the reaction started.

The resultant foam had the carbonaceous fibers distributed throughout from 0.2 to 0.4 millimeter. Such foams provide excellent insulating value and relatively low density stable products.

The addition of carbonaceous particles or platelets improves the flame retarding characteristics without any substantial loss in foam properties.

In the following examples, a plurality of foams are prepared under varying conditions. In each case, the polymer is heat plastified in an extruder substantially in the manner of U.S. Pat. No. 2,669,751 and a volatile fluid blowing agent injected into the heat plastified polymer stream. From the extruder the heat plastified gel is passed into a mixer, the mixer being a rotary mixer wherein a studded rotor is enclosed within a housing which has a studded internal surface which intermeshes with the studs on the rotor. The heat plastified gel from the extruder is fed into the end of the mixer and discharged from the remaining end, the flow being in a generally axial direction. From the mixer, the gel passes through coolers such as are described in U.S. Pat. No. 2,669,751 and from the coolers to a die which extrudes a generally rectangular board. After extrusion a foam of an acceptable, density, cell size, compressive strength, water vapor permeability and thermal conductivity is obtained.

EXAMPLE 3

Polystyrene having a viscosity of 14 centipoises (measured as a 10 percent solution in toluene) is fed to an extruder at the rate of 541 parts by weight per hour together with a mixture of linear fibers and carbonaceous particles having a nitrogen content about 18% so as to amount to 20% of the resulting foam. The blowing agent consists of a 1:1 by weight mixture of methyl chloride and dichlorodifluoromethane which is injected into the heat plastified polymer prior to its entry to the mixer. A total feed of $20.3 \times 10^{-4}$ moles of blowing agent per gram of polystyrene is added as a nucleator. A stable rectangular board is extruded at a temperature of 121.5 degrees Celsius having a cross-sectional dimensions of 2.25×24 inches. The carbonaceous materials were distributed fairly uniformly throughout the foam. The resulting foam possessed anti-static characteristics.

EXAMPLE 4

Two flammability tests were run on a foam blends with carbonaceous fibers. Test A was the 45 degree Flammability Test (AATCC Test Method 33-1962— Flammability of Clothing Textiles) which is duplicated by ASTM D1230 and ASA L14.69 and is the same as the described in Title 16—Commercial Practices part 1610—Code of Federal Regulations. This test consists of impinging a ⅜" flame (butane) onto a 2"×4" sample held at a 45 degree angle for one second. The samples of the invention failed to ignite even when the flame impingement was greater than 90 seconds.

The second test, Test B, was the 90 degree angle test used for children's sleepwear testing [see U.S. Department of Commerce standard DOC FF 3071 (as amended) and FF5-74]. The method consists of exposing a 2"×10" specimen suspended in a vertical position to a Bunsen burner (propane or methane gas) such that ⅜ inches of lower edge of the specimen is in the flame for 3-12 seconds. The specimens of the invention failed to ignite even after ten minutes in the flame. This test is considered the most severe test method and is primarily designed to test for non-flammable or flame retardant fibers. The results are shown in the following table:

| Sample | Test | % Fiber | Fiber Heat Treatment Temp. | % Foam | Foam Type | Batting Thickness |
|---|---|---|---|---|---|---|
| 1 | A | 70 | 550 | 30 | cured foam acrylic latex | ¼" |
| 2* | — | 20 | 650 | 80 | cured foam acrylic latex | ¼" |
| 3 | B | 50 | 650 | 50 | DER cured epoxy | ¼" |

*Sample 2 was tested by impinging an air/acetylene flame (flame tem. = 2460 degrees Celsius) against the face of the sample for 30 seconds. The specimen failed to ignite or burn and the surface face side opposite the impingement flame tip remained cool enough to touch with an unprotected finger.

All of the above specimens passed the respective test, that is, they all failed to ignite or burn under the test conditions used.

EXAMPLE 5

A minimum of three 1"×6"×12" (2.54 cm×15.24 cm×30.48 cm) foam-carbonaceous fiber specimens containing 30% by weight of carbonaceous fibers were conditioned by maintaining the specimens in a conditioning room maintained at 70 degrees Celsius 5% relative humidity for 24 hours preceding the test. The foam was polyurethane.

Each specimen was supported vertically and exposed to a Bunsen burner with a nominal I.D. tube of 1½ inches (3.8 cm) in height. The minimum flame temperature measured by a calibrated thermocouple pyrometer in the center of the flame was 1550 degrees Fahrenheit. The lower edge of the specimen was ¾ inch (1.91 cm) above the top edge of the burner. The flame was applied to the cluster line of the lower edge of the specimens for 12 seconds and then removed.

Pursuant to the test, the material of the invention was considered self-extinguishing. The average burn length did not exceed 8 inches (20.32 cm), the average after flame did not exceed 15 seconds and there were no flaming drippings.

The same results can be achieved with urea, polystyrene, polyolefin, isocyanurate, latex or epoxy foam structures.

EXAMPLE 6

Following the procedure of U.S. Pat. No. 4,640,933, a polyolefin foam composition is prepared having flame retarding characteristics by admixing in the reaction mixture, prior to expansion, 20% by weight of carbonaceous fibers and particles having a carbon content of about 85%.

Placing carbonaceous particles or platelets on the surface of the foam provides an effective surface flame barrier.

What is claimed is:

1. A flame retardant polymeric foam, said foam having incorporated therein a flame retarding amount of non-graphitic carbonaceous materials having an LOI value greater than 40, said carbonaceous materials being in the form of particles, platelets, linear fibers or the combination of non-linear fibers having a reversible deflection greater than 1.2:1 and an aspect ratio greater than 10:1 with said particles or platelets.

2. The foam of claim 1, wherein said carbonaceous particles are on the surface of said foam.

3. The foam of claim 1, wherein said carbonaceous materials have a carbon content of less than 85%.

4. The foam of claim 1, wherein said carbonaceous materials have a carbon content of at least 85%.

5. The foam of claim 1, wherein said carbonaceous materials are derived from stabilized acrylic fibers.

6. The foam of claim 5, wherein said carbonaceous materials are derived from stabilized polyacrylonitrile fibers.

7. The foam of claim 1, wherein said carbonaceous fibers are linear and have a nitrogen content of from about 16 to 18%.

8. The foam of claim 1, wherein said foam contains carbonaceous particles.

9. The foam of claim 1, wherein said foam is a polystyrene foam.

10. The foam of claim 1, wherein said foam is a polyurethane foam.

11. The foam of claim 1, wherein said carbonaceous fibers are linear and comprise at least 0.5% by weight of said foam on at least one surface.

12. The foam of claim 1, wherein said carbonaceous materials are distributed substantially about the outer surface of said foam.

13. The foam of claim 1, wherein said carbonaceous fibers are distributed throughout said foam.

14. The foam of claim 13, wherein said carbonaceous materials comprise at least 10% by weight of said foam.

15. The foam of claim 1, wherein said polymeric foam comprises a foamed resin selected from the group consisting polyurethane, urea, latex, polyolefin, polystyrene and isocyanurate.

16. A bedding article comprised of the flame retardant polymeric foam of claim 1.

17. The bedding article of claim 16 wherein the bedding article is a pillow.

18. The bedding article of claim 16 wherein the bedding article is a pillow.

19. An upholstered article comprised of the flame retardant polymeric foam of claim 1.

20. The upholstered article of claim 19 wherein the upholstered article is adapted for installation in an aircraft.

21. The upholstered article of claim 20 comprising an aircraft seat assembly.

* * * * *